United States Patent Office 2,728,743
Patented Dec. 27, 1955

2,728,743

CURING SILOXANE ELASTOMERS CONTAINING HALOGENATED ALIPHATIC RADICALS WITH POLYAMINES

Earl Leathen Warrick, Pittsburgh, Pa., assignor to Dow Corning Corporation, Midland, Mich., a corporation of Michigan No Drawing. Application February 25, 1953,
Serial No. 338,889

4 Claims. (Cl. 260—46.5)

This invention relates to organopolysiloxane elastomers.

At the present time, practically all commercial polysiloxane elastomers are prepared by vulcanizing hydrocarbon-substituted organosiloxanes with organic peroxides. In general, the amount of peroxide employed is of the order of 1 to 2 per cent by weight based upon the weight of the siloxane. This method gives vulcanization in a matter of 5 minutes at temperatures of 100° C. to 150° C. and accordingly has met with considerable commercial success. However, the activity of the peroxide or its decomposition products continues after this vulcanization period. As a result, there is a tendency for the siloxane to over vulcanize upon being subjected to elevated temperatures. Thus, there is always a certain degree of degradation of peroxide vulcanized polysiloxane elastomers which occurs upon prolonged heating. Some of this degradation is due to oxygen of the air, but a large portion of it is due to the residual peroxide vulcanizing agent. It is highly desirable, therefore, to find a commercially feasible method for vulcanizing polysiloxanes which does not involve the use of peroxides.

It is an object of this invention to provide improved organosiloxane elastomers which have thermal stabilities greater than presently available peroxide vulcanized siloxane elastomers. Another object of this invention is to provide siloxane elastomers which will cure at room temperature. Another object is to provide caulking materials which possess all of the desirable qualities of organic putty with the added advantage of freedom from hardening. Another object is to provide a method for curing siloxane coatings. Other objects and advantages will be apparent from the following description.

This invention relates to a curable composition of matter comprising (1) a polymeric siloxane having a viscosity of at least 100 cs. at 25° C. and having from 1.9 to 2.1 organic radicals per silicon atom, said radicals being of the group saturated aliphatic hydrocarbon, monocyclicaryl hydrocarbon, and saturated halogenated aliphatic hydrocarbon radicals, and (2) a polyamine of the group consisting of acyclic aliphatic polyamines containing only nitrogen, carbon and hydrogen atoms; aromatic polyamines containing only nitrogen, carbon and hydrogen atoms; acyclic aliphatic polyamines containing only nitrogen, carbon, hydrogen and oxygen, the latter being present only as an ether linkage; acyclic aliphatic polyamines containing only carbon, nitrogen, hydrogen and oxygen, the latter being present only in a hydroxyl radical and monocyclic polyamines containing only carbon, nitrogen, hydrogen and oxygen, the latter being present only as an ether linkage, in amount of at least 1 molecule of amine per 400 silicon atoms. The saturated halogenated aliphatic hydrocarbon radicals in the polysiloxane are present in amount of at least 1 of said radicals per 200 silicon atoms. In the saturated halogenated aliphatic hydrocarbon radicals, no more than 1 halogen atom is present on any one carbon atom and there is no halogen atom on a carbon atom beta to the silicon atom to which the radical is attached.

The elastomers are prepared by merely bringing the above two ingredients into contact. The rate of curing will depend upon the temperature and the concentration of halogenated aliphatic radicals and the amine. For example, when the amine is employed in amount of about 1 mol per cent based on total mols of siloxane and when the concentration of the halogenated aliphatic radical is about 5 mol per cent based on the total siloxane, curing at 25° C. requires several days. At the same concentration of amine and halogenated radicals, curing at 150° C. requires only 15 minutes. The rate of cure at any given temperature can be increased by increasing the concentration of halogenated aliphatic radicals and/or the concentration of the amine. If desired curing temperatures of 400° C. may be employed if the time of exposure is brief.

When curing temperatures of above 75° C. are employed, provision must be made for the escape of volatile materials from the elastomer. If this is not done, little or no cure is obtained. For this reason, curing of the elastomers is best carried out in an open system, i. e., in the open air or in a container having an outlet.

Siloxanes which are employed in this invention are those which have viscosities of at least 100 cs. The upper viscosity limit of the siloxane is not critical so that the polymers may vary from thin fluids to non-flowing solids. In the polysiloxane, there is from 1.9 to 2.1 organic groups per silicon atom. These organic groups are attached to the silicon through SiC linkages and the groups may be any saturated aliphatic hydrocarbon radical or any monocyclicaryl hydrocarbon radical. In addition, the siloxanes contain certain saturated halogenated aliphatic hydrocarbon radicals. In the latter, the halogen has an atomic number above 16. Preferably the halogen is chlorine or bromine.

Whereas the curing reaction of this invention will take place with siloxanes containing any saturated halogenated aliphatic hydrocarbon radical, some such radicals are not suitable because of their instability. For example, siloxanes containing halogenated aliphatic radicals having a halogen atom beta to the silicon, are unstable towards hydrolytic cleavage. This is also true of siloxanes containing halogenated radicals having more than one halogen atom on any one carbon. For these reasons, the elastomers of this invention are restricted to siloxanes in which the halogenated radicals have only one halogen atom on any one carbon and have no halogen atoms beta to the silicon.

In order for effective curing to be obtained, it is necessary that there be at least one halogenated aliphatic hydrocarbon radical per 200 silicon atoms. However, there is no critical upper limit to the number of halogenated aliphatic radicals. Generally, however, it is preferred to employ copolymers of halogenated aliphatic siloxanes and hydrocarbon substituted siloxanes.

Specific examples of halogenated aliphatic radicals which are operative in this invention are chloromethyl, bromomethyl, alphachloroethyl, alpha-gamma-di-chloropropyl, iodomethyl, 3,6-dichlorohexyl, and polychlorinated cyclohexyl and octadecyl radicals which have only one chlorine per carbon atom and no chlorine beta to the silicon.

Preparation of halogenated aliphatic siloxanes is best carried out by the direct halogenation of the corresponding saturated aliphatic hydrocarbon silane $(R_nSiX_{4-n})$ or the corresponding saturated aliphatic hydrocarbon siloxanes. The halogenation is carried out in the presence of ultra violet light. In general, a mixture of products is obtained which may be separated by distillation to give the products useful in this invention. The iodo aliphatic siloxanes are best prepared by an exchange reaction between, for example, the corresponding chlorinated aliphatic siloxanes and sodium or potassium iodide.

For the purposes of this invention the siloxanes may be homopolymers containing only the above-defined halogenated aliphatic hydrocarbon radicals or they may be copolymers containing only those radicals or they may be copolymers containing the above halogenated radicals and the above-defined hydrocarbon radicals. Specific examples of copolymers which are operative herein are those of dimethylsiloxane and chloromethylmethylsiloxane; copolymers of bis-chloromethylsiloxane and bis-alpha-chloroethylsiloxane; copolymers of phenylmethylsiloxane and alphachloroethylmethylsiloxane; copolymers of bis-bromomethylsiloxane and chloromethylmethylsiloxane; copolymers of octadecylbutylsiloxane and 6-chlorohexylmethylsiloxane; copolymers of bis-chloromethylsiloxane and diphenylsiloxane; and copolymers of cyclohexylmethylsiloxane and bromomethylmethylsiloxane. Specific examples of operative homopolymers are bromomethylmethylsiloxane, 3,4,5-trichloropentylphenylsiloxane and bis-chloromethylsiloxane. It is to be understood that iodine can be substituted for the halogen in any of the above siloxanes.

The elastomers are made up primarily of siloxane units containing two of the above-defined organic groups per silicon atom. However, the elastomers may contain up to 10 mol per cent siloxane units of the type $RSiO_{3/2}$ or up to 10 mol per cent of units of the formula $R_3SiO_{1/2}$. Some or all of the organic groups in these siloxane units may be the defined halogenated radicals while the remaining R groups, if any, may be any of the above-defined hydrocarbon radicals.

Any polyamine within the scope of the above definition can be employed to cure the elastomers of this invention. The amines may be either monomeric or polymeric compounds. The amines may be primary, secondary or tertiary with respect to any or all of the amino groups. They may be aliphatic or aromatic polyamines and finally the amines may contain oxygen atoms along the chain such as, for example, polyether amines. In addition the amines may contain hydroxyl groups.

Specific examples of amines which are operative are ethylenediamine, triethylenetetraamine, $(C_2H_5)_2N(CH_2)_6N(C_2H_5)_2$ $NH_2C_2H_4OC_2H_4OC_2H_4OC_2H_4NH_2$ and di-o-tolylguanidine.

In order for curing to take place in a reasonable time, the amine should be present in amount of at least 1 molecule of amine per 400 silicon atoms. The upper limit of the amount of amine relative to the siloxane is not critical. In general, the optimum concentration is one molecule of amine per 2 halogenated radicals in the siloxane. However, if the amine is volatile, it is well to employ substantially more than this amount in order to compensate for evaporation during cure.

The amine and the polysiloxane may be mixed in any convenient manner. For example, they may be milled on a rubber mill or they may be dispersed in a mutual solvent, or cure may be effected by merely contacting the surface of the siloxane with the amine. The latter method is particularly useful where only surface cures are desired or where only thin coatings of the siloxane are being cured. When curing coatings by contacting the surface thereof, it is preferable to use an amine which is soluble in the siloxane.

The method of this invention is particularly adaptable for the preparation of coated materials. Inasmuch as the cure proceeds at room temperature, it is appropriate for the preparation of coated organic fabrics or other relatively thermally unstable materials.

This invention may be employed advantageously for the preparation of siloxane putties. Siloxane putties which have been previously employed have the advantage of maintaining their resiliency indefinitely when exposed to atmosphere. However, due to their very inertness, they remain tacky and thereby accumulate dirt on their surface. This is objectionable where the putty is in a position where it can be seen. The present invention, however, offers a way to obviate this difficulty. The polysiloxane with or without a filler can be placed in the space to be caulked and the surface thereof painted with the amine. Curing will occur only at the surface thereby forming a putty which is non-tacky on the surface but will remain tacky and soft indefinitely on the inside. Thus, the putty will not crack or fall out of the joint and at the same time will not accumulate dirt.

The elastomers of this invention may be advantageously reinforced by including therein various fillers. These fillers include heavy metal oxides such as titania, zinc oxide, zirconia, ferric oxide; siliceous materials such as clay, powdered quartz, diatomaceous earth, silica aerogels and fume silicas; carbon black; and organic materials such as cork, wood flour and cotton linters.

The following examples are illustrative only and are not to be construed as limiting the invention which is properly delineated in the appended claims.

EXAMPLE 1

The polymer used in this example was prepared by copolymerizing octamethylcyclotetrasiloxane and chloromethylheptamethylcyclotetrasiloxane in such proportions that the resulting polymer contained 5 mol per cent chloromethylmethylsiloxane units. The polymerization was carried out in the presence of a small amount of fuming sulfuric acid at a temperature of 25° C. until the material was a non-flowing solid having a molecular weight of about 500,000. The resulting polymer was washed free of acid and the neutral product was employed in each of the runs shown in Table I below. In the table, the amount of amine is expressed in ml. per 100 g. of siloxane for liquid amines and in g. per 100 g. of siloxane for solid amines.

In all of the runs shown in the table, the amine and the polymer were milled until a uniform mix was obtained. The sample was then placed in an aluminum dish and heated in air as indicated. In runs 4 and 6, the sample was covered with aluminum foil during curing. In all of the cases shown below, curing of the siloxane took place to produce an elastomeric product.

*Table I*

| Run | Amine | Amount of amine per 100 g. of siloxane | Temp. in ° C. | Time in min. |
| --- | --- | --- | --- | --- |
| 1 | $NH_2C_2H_4NHC_2H_4NHC_2H_4NH_2$ | 5 ml | 150 | 15 |
| 2 | $C_2H_5NHC_2H_4NHC_2H_4NHC_2H_5$ | 0.8 ml | 150 | 15 |
| 3 | $H_2NC_2H_4OC_2H_4OC_2H_4OC_2H_4NH_2$ | 5 ml | 150 | 15 |
| 4 | $H_2NCH_2CH_2NH_2$ | 3 ml | 150 | 15 |
| 5 | $HOC_2H_4NHC_2H_4NH_2$ | 5 ml | 150 | 15 |
| 6 |  | 5 ml | 250 / 150 / 250 | 60 / 15 / 60 |
| 7 | $H_2N(CH_2)_6NH_2$ | 50 g | 150 | 15 |
| 8 | $(CH_3)_2N(CH_2)_6N(CH_3)_2$ | 30 ml | 150 | 15 |
| 9 | $[p-(CH_3)_2NC_6H_4]_3CH_3$ | 5–10 g | 150 / 250 | 15 / 60 |
| 10 | $[o-CH_3C_6H_4NH]_2C=NH$ | 10 g | 150 / 250 | 15 / 60 |
| 11 | $p-H_2NC_6H_4NH_2$ | 5 ml | 150 / 250 | 15 / 50 |

The composition of runs 1, 2, 3, and 4 cured after several weeks' standing at room temperature.

EXAMPLE 2

100 parts by weight of the polymer of Example 1 was milled with 30 parts by weight of a finely divided silica which had been treated with trimethylchlorosilane and with 5 parts by weight of $C_2H_5NHC_3H_6NHC_3H_6NHC_2H_5$. The resulting material was cured in air in an aluminum dish for 15 minutes at 150° C. A satisfactory elastomer was obtained.

EXAMPLE 3

100 parts of the polymer of Example 1 was milled with 220 parts of diatomaceous earth and 5 parts of a fume silica. The material was placed in an aluminum dish and the surface of the sample was wet with the amine, $$C_2H_5NHC_3H_6NHC_3H_6NHC_2H_5$$

The sample was then heated at 100° C. for one hour. A non-tacky, rubbery surface skin 1 mm. thick was thereby formed. The inside of the sample was still soft and tacky. This indicates that the material would perform satisfactorily as a putty.

When a copolymer of 50 mol per cent chloromethylmethylsiloxane and 50 mol per cent dimethylsiloxane is treated in the above manner, a non-tacky surface skin will form at room temperature in 24 hours.

EXAMPLE 4

The polymer of Example 1 was spread in a thin layer over glass tape. The amine of Example 3 was brushed over the surface of the polymer. The coated tape was then heated 30 minutes at 150° C. whereupon the coating was completely cured to a rubbery, elastomeric material.

EXAMPLE 5

Satisfactory cures are obtained when each of the 10,000 cs. copolymers listed below is mixed with triethylenetetraamine in amount of 1 molecule of amine per 2 halogenated radicals and the resulting mixture is heated for 15 minutes at 150° C.

| | |
|---|---|
| Bromomethylmethylsiloxane | 10 |
| Dimethylsiloxane | 90 |
| Iodomethylmethylsiloxane | 30 |
| Dimethylsiloxane | 70 |
| 6-chlorohexylethylsiloxane | 75 |
| Phenylmethylsiloxane | 25 |
| Bis-3-chloropropylsiloxane | 100 |
| 3-chlorocyclohexylmethylsiloxane | 50 |
| Alphachloroethylmethylsiloxane | 50 |
| Chloromethylmethylsiloxane | 20 |
| Mono-octadecylsiloxane | 10 |
| Tolylmethylsiloxane | 70 |
| Bis-bromomethylsiloxane | 10 |
| Benzylmethylsiloxane | 88 |
| Chloromethyldimethylsiloxane | 2 |

That which is claimed is:

1. A curable composition of matter comprising (1) a polymeric organosiloxane having a viscosity of at least 100 cs. at 25° C. and having from 1.9 to 2.1 organic radicals per silicon atom, said radicals being selected from the group consisting of saturated aliphatic hydrocarbon radicals, monocyclicaryl hydrocarbon radicals, and saturated halogenated aliphatic hydrocarbon radicals, said halogenated radicals being present in amount of at least 1 halogenated radical per 200 silicon atoms, the halogen in said halogenated radicals having an atomic number greater than 16 and in said halogenated radicals there being no more than 1 of said halogen atoms per carbon atom and there being no halogen atom on a carbon atom beta to the silicon atom to which the halogenated radical is attached at least a portion of said organic radical being halogenated radicals and (2) a polyamine selected from the group consisting of acyclic aliphatic polyamines containing only nitrogen, carbon and hydrogen atoms; aromatic polyamines containing only nitrogen, carbon and hydrogen atoms; acyclic aliphatic polyamines containing only nitrogen, carbon, hydrogen and oxygen, the latter being present only as an ether linkage; acyclic aliphatic polyamines containing only carbon, nitrogen, hydrogen and oxygen, the latter being present only in a hydroxyl radical and monocyclic polyamines, containing only carbon, nitrogen, hydrogen and oxygen, the latter being present only as an ether linkage, in amount of at least 1 molecule of the amine per 400 silicon atoms.

2. A composition in accordance with claim 1 in which the siloxane is a copolymer of chloromethylmethylsiloxane and dimethylsiloxane.

3. A method of preparing siloxane elastomers which comprises contacting (1) a polymeric organosiloxane having a viscosity of at least 100 cs. at 25° C. and having from 1.9 to 2.1 organic radicals per silicon atom, said radicals being selected from the group consisting of saturated aliphatic hydrocarbon radicals, monocyclicaryl hydrocarbon radicals, and saturated halogenated aliphatic hydrocarbon radicals, said halogenated radicals being present in amount of at least 1 halogenated radical per 200 silicon atoms, the halogen in said halogenated radicals having an atomic number greater than 16 and in said halogenated radicals there being no more than 1 of said halogen atoms per carbon atom and there being no halogen atom on a carbon atom beta to the silicon atom to which the halogenated radical is attached at least a portion of said organic radical being halogenated radicals, with (2) a polyamine selected from the group consisting of acyclic aliphatic polyamines containing only nitrogen, carbon and hydrogen atoms; aromatic polyamines containing only nitrogen, carbon and hydrogen atoms; acyclic aliphatic polyamines containing only nitrogen, carbon, hydrogen and oxygen, the latter being present only as an ether linkage; acyclic aliphatic polyamines containing only carbon, nitrogen, hydrogen and oxygen, the latter being present only in a hydroxyl radical and monocyclic polyamines containing only carbon, nitrogen, hydrogen and oxygen, the latter being present only as an ether linkage, in amount of at least 1 molecule of the amine per 400 silicon atoms, at a temperature of at least 25° C.

4. A method in accordance with claim 3 wherein the siloxane is a copolymer of chloromethylmethylsiloxane and dimethylsiloxane.

References Cited in the file of this patent

UNITED STATES PATENTS

| | | |
|---|---|---|
| 2,457,539 | Elliot et al. | Dec. 28, 1948 |
| 2,500,842 | MacKenzie et al. | Mar. 14, 1950 |

OTHER REFERENCES

Hackh's Chemical Dictionary, 3rd edition, Blakiston, 1944, page 43.

Rochow: An Introduction to the Chemistry of the Silicones, 2nd edition, Willery, 1951, pages 15, 16, 58 and 59.